Figure 1:
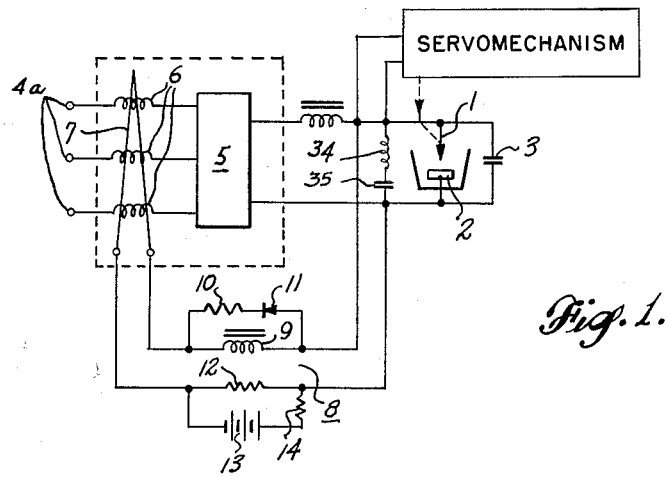

May 7, 1963   KIYOSHI INOUE   3,089,018
DISCHARGE MACHINING APPARATUS
Filed Aug. 29, 1960

INVENTOR.
KIYOSHI INOUE
BY
Reynolds & Christensen
ATTORNEYS

United States Patent Office 3,089,018
Patented May 7, 1963

3,089,018
DISCHARGE MACHINING APPARATUS
Kiyoshi Inoue, 182 Yoga Tamagawa Setagaya-ku,
Tokyo, Japan
Filed Aug. 29, 1960, Ser. No. 52,394
Claims priority, application Japan Oct. 29, 1959
12 Claims. (Cl. 219—69)

My invention is generally a discharge machine apparatus and, in particular, an improved discharge machining apparatus incorporating current control device during a short circuit.

Generally, in order to decrease the short circuit current when an electrode and a workpiece form a short circuit, a suitable current control device, for instance, a saturable reactor, is connected with the charging power source device of a pulsation generating condensor. In normal machining, the said saturable reactor is strongly saturated and maintains impedance in practice at a value near zero, releasing the saturation only when the short circuit is formed to cause high impedance and thus controls the short circuit current. And, when the gap between electrode and workpiece returns to normalcy due to electrode servo mechanism, the saturable reactor returns to be saturated.

As is the custom of this type of automatic control mechanism, irregularity is often caused in electrode feed device during the short circuit. In a discharge machining apparatus, when irregularity is caused once in the electrode feed mechanism, the electrode is moved up and down in irregularity with the ultimate result of temporary short circuit between two poles and thus continuous machining is rendered to be impossible.

The following are considered to be reasons for such irregularity of the electrode feed. In discharge machining mechanism, the discharge gap is extremely narrow in the order of a few micron millimeters and consequently the machining gap is placed constantly in the position of short circuit due to chips, etc. Even when the short circuit is not observed, the gap is virtually brought further narrower due to chips, etc., thus, in practice, the mean resistance value between poles is very much descreased. If the servo mechanism is the one which detects the mean resistance value between poles or the gap resistance between poles and controls automatically the electrode feed mechanism by means of signals, the machining electrode is apt to receive upward pressure immediately at the decreased resistance value, or equivalently, decreased gap voltage, and it takes, in practice, some time before the electrode begins to move upward because of the inertia of the servo mechanism.

What is referred to herein as the mean resistance value is to mean the resistance value as mentioned below. Frequency of repeated discharges in discharge machining reaches from several hundred kilocycles to 1 mc. and the resistance value at the gap at each discharge varies from zero to the maximum value. In order to show those values as the effective resistance value, the arithmetical mean value of those values is referred to as the mean resistance value. The same arithmetical mean values of the gap voltage or gap current is also considered to show the mean gap voltage or the mean gap current.

As mentioned above, when the electrode is pushed upward, the control coil is accelerated, on the other hand, in order to relieve the saturable reactor of saturation. But in the accelerating circuit of the control circuit, peculiar time constant exists and it is impossible to relieve the saturable reactor of saturation instantaneously. Due to the delay by means of the time constant, even when the electrode commences to be pushed upward, complete unsaturation will not occur, and a result, between the electrode and the work which begins to be separated, current of a large volume will flow and spark discharges move into arc discharges. When arc discharges begin, the mean resistance value of the gap decreases further and the servo mechanism will try to push the electrode upward with increased strength. Only when the gap is increased in a distance sufficient to cancel out the arc discharges, the electrode is stopped. But the gap thus reached will be too big a distance to cause spark discharge, and machining cannot be resumed at the said gap. Consequently, the servo mechanism moves in reverse direction to bring the electrode downward.

When the electrode is pushed upward to such a gap as to eliminate arc discharges, the means resistance value returns to normalcy and the saturable reactor is maintained saturated. Thus the voltage in the pulsation generating condensor will be raised to that of normal machining. The downward moving electrode will increase its speed. Thus, coupled with the inertia of the moving electrode, the electrode cannot be stopped at the required position with any type of servo mechanism, and, therefore, the electrode which passes the required position in its downward movement is caused to discharge sparks or arcs by means of normalized condensor voltage, and further is pushed downward so that the short circuit is formed when the servo mechanism starts to push upward the servo mechanism which is moving downward. If the above mentioned series of phenomena starts to show itself, the servo mechanism will inevitably start to have irregular vibrations, and the irregularity in the electrode feed will not be avoided.

In order to relieve the discharge machining apparatus of the above mentioned drawbacks, my invention proposes a discharge machining apparatus which pervents the irregularity in the electrode servo mechanism at the time of short-circuit.

Another object of my invention is to propose a discharge machining apparatus which normalizes the machining voltage when the discharge gap is brought so that stabilized discharges will occur.

The other object of my invention is to propose a discharge machining apparatus which brings the electrode to a required position within the shortest time.

For the said purpose, in example of my invention, a delaying element is inserted in the accelerating circuit of control coil of saturable reactor in order to keep the saturable reactor unsaturated when the mean resistance value of gap voltage is brought back to normalcy and to delay the current in the control circuit and saturation until the electrode is stabilized at the required position.

In another example of my invention the electrode feed motor which composes the servo mechanism is superimposed with a D.C. voltage which varies depending upon charging current of the pulsation generating condensor.

Explanations are now given with particular references to drawings.

In FIGURE 1, a practical example of discharge machining apparatus which is constructed so as to prevent irregularity in the electrode feed is given.

Figure 2:
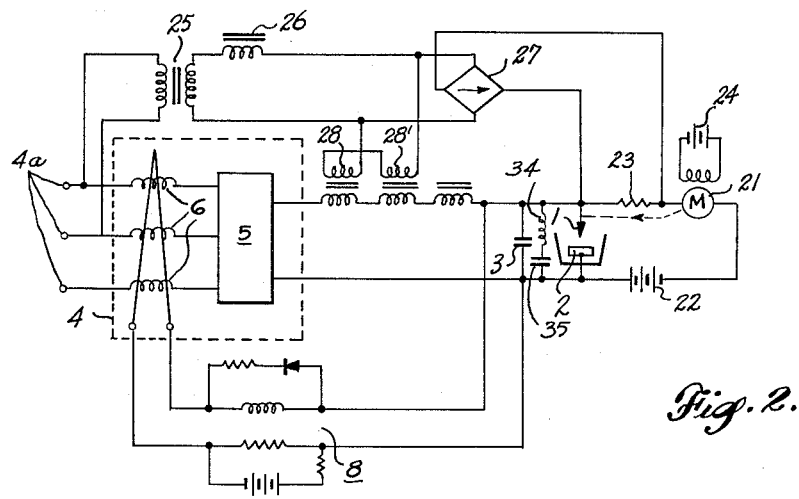

In FIGURE 2, the circuit of an improved electrode servo mechanism of a discharge machining apparatus is given.

Figure 3:
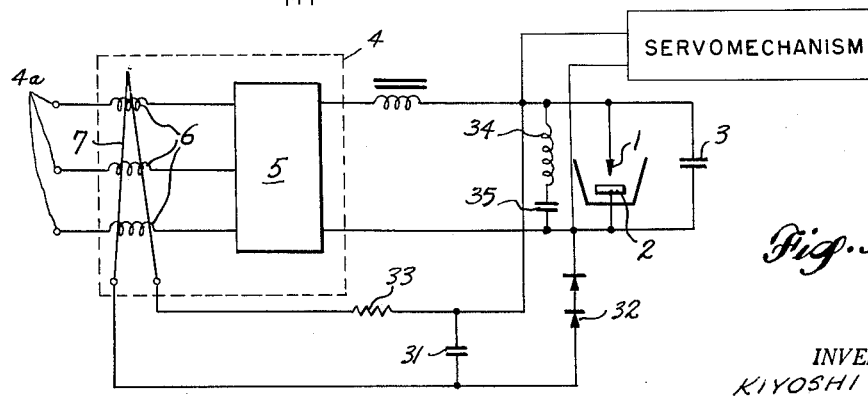

FIGURE 3 is a further improved version of FIGURE 2.

In FIGURE 1, machining electrode 1 and workpiece 2 form a discharge gap. A pulsation generating condenser 3 is connected between the electrode 1 and the workpiece 2. Said condenser 3 is charged by a power source 4. As may be understood there is stray inductance in the lead by which condenser 3 is connected across the discharge gap. This stray inductance is denoted in FIGURES 1, 2 and 3 by inductance 34 and condenser 35 connected in series shunting the discharge gap. Said power source 4 is composed of a rectifying device 5, saturable reactor 6 and control coil 7 of said reactor 6. Control coil 7 is accelerated by an accelerating circuit 8 of my invention. The input terminal of said circuit is connected between the discharge gap, and the output terminal is connected with the control coil of the saturable reactor. At a time of short circuit, in order to relieve the saturable reactor of saturation rapidly, a D.C. power source 13 and a resistance 14 and a low resistance which is connected with said D.C. power source and said resistance in parallel are installed, and to delay saturation of saturable reactor, an inductance 9, a resistance 10 which is connected in parallel to said inductance and a rectifying device 11 are shown. The voltage of said D.C. power source 13 is fixed at smaller value than the gap voltage during the normal machining, and resistance value of the resistance 12 must be selected at much smaller value than that of resistances 10 and 14 and is recommended to be in the neighborhood of several ohms. This is primarily to minimize the voltage of the resistance 12, and thus when the normal machining is continued, the saturable reactor 6 is maintained at saturation by means of accelerating current which flows in the control coil 7 through the inductance 9 and the resistance 12.

When the discharge gap is made very narrow or when a short circuit occurs, current flows from the D.C. power source 13 through the resistance 14, the rectifying device 11, and the resistance 10 and the coil 77 is energized to relieve the saturable reactor 6 of saturation, and, therefore, the machining current decreases rapidly by the time when the electrode is pushed upward corresponding to the decreased mean resistance value. On the other hand, when the mean resistance value or gap voltage is increased, the coil 7 is accelerated by the said voltage through the resistance 12 and the inductance 9. The said accelerating current is affected by a high time constant fixed by the high inductance 9 set at several tens of henries and by the resistance 12, and there will be a lapse of several seconds before the saturable reactor 6 is completely saturated. The delay is set at the period of time required for the electrode which is pushed upward by short circuit starts to move downward and stops at the required position to resume stabilized discharges.

Based on the system as mentioned above, the saturable reactor is gradually saturated and the recovery of gap voltage is always smooth, and thus the irregularity of electrode feed can perfectly be prevented. The feed mechanism of this nature assures high precision machining.

In FIGURE 2, an improved version of mechanism shown in FIGURE 1 is given. The drawback of the mechanism in FIGURE 1 is that at the time of short circuit the electrode which is pushed upward and commences to move downward is effected by gap voltage which rises very slowly and the speed of its downward movement is very much disturbed. Such a phenomenon prolongs the start of machining as the natural result and affects very adversely on machining speed. Especially in deep hole drilling, the short circuit between chips accumulated on the side wall of electrode will force the chips to be brought upward together with the electrode when the latter is forced upward and only when the electrode is way above the workpiece and when the chips are separated the electrode is released from short circuit. In such a case, in each short circuit the electrode may be forced to travel upward and downward through the machined hole, and thus will cause considerable delay in machining speed.

In view of such shortcomings, my invention proposes a discharge machining apparatus wherein D.C. voltage is supplied to the servo motor circuit of electrode feed in accordance with charging current of pulsation generating condenser in order to fasten the downward speed of electrode.

In FIGURE 2 a pulsation generating condenser 3 is connected between the electrode 1 and the workpiece 2 and said condenser is connected with a charging power source device 4 which charges the said condenser 3. Said charging power source 4 is the same as shown in FIGURE 1. Electrode 1 is fed upward and downward by a servo motor 21 whose armature current is supplied in the algebraical total of standard voltage source 22, gap voltage and terminal voltage of the resistance 23. A constant voltage power source 24 is equipped in order to excite the field coil of motor 21. Voltage value of standard voltage power source 22 is normally discharged in succession in the discharge gap and must be selected to be equal to gap voltage when machining is in progress.

A transformer 25 connected through the primary winding with an A.C. power source is connected at its secondary output winding with a rectifying element 27 through a reactor 26, and output voltage of said rectifying element supplies current to said resistance 23. On the other hand, the rectifying element is connected in parallel with the saturable reactors 28 and 29', whose control windings are inserted in series with the charging circuit of the pulsation generating condenser 3. The saturable reactors 28 and 28' are, in normal machining time, saturated by charging current of the condenser 3 and maintain the rectifying element 27 in short circuit. When charging current becomes zero, the saturation is released and, consequently, output voltage will occur in said rectifying element 27.

In this type of circuit system, as long as normal machining is maintained, terminal voltage of the resistance 23 is zero and therefore, voltage of the standard power source 22 and gap voltage cancel each other and the motor 21 is kept at standstill.

When the discharge gap is short circuited, the above changes rapidly, and saturation of the saturable reactor in the power source device 4 is released, and machining current decreases very rapidly as mentioned above. On the other hand, short circuit current will flow in some degree until the electrode is pushed upward so much that arc discharges disappear completely. By means of this current the saturable reactors 28 and 28' are kept saturated and terminal voltage of the resistance is kept at zero until the short circuit is completely released. Consequently, the accelerating voltage of motor 21 is only standard voltage and the electrode is pushed upward very rapidly. When the electrode is pushed upward and the system is freed from the short circuit, the gap voltage should return to normalcy, as explained in detail in FIGURE 1. Rise of gap voltage is very slow affected by delaying element and it takes considerable time for the said voltage to surpass the standard power source 22 voltage. Due to those reasons, even when the motor moves to bring the electrode downward against all the conditions because of difference in voltages between the two, the differential voltage is negligible and downward speed will also be very slow.

Such phenomena can, however, be controlled by the terminal voltage of resistance 23 which has risen to the required voltage. Even when there is no difference between the gap voltage and the standard voltage or even when the gap voltage is still in the process of rising, terminal voltage of the resistance 23 moves to force the electrode downward by cancelling out the standard voltage. When the electrode reaches the required position and required discharges commence to be discharged, the saturable reactors 28 and 28' are saturated. Together with saturation process, the terminal voltage of resistance becomes zero and the motor 21 stops.

The terminal voltage of condenser 3 will return to normalcy at this stage, as explained in FIGURE 1.

In FIGURE 3, another improved version is shown. An example is given wherein the current which flows between the gap is decreased corresponding with the decreased means resistance value of the discharge gap and discharges are brought back to normalcy, and in so doing, as a controlling method, electric energy which occurs when electrical polarity reverses itself in discharge is utilized. When the workpiece 2 is machined, it is generally believed natural that the workpiece 2 should be connected with positive pole and the electrode with the negative pole, but due to inductance found in discharging circuit of the condenser 3, current flowing through the said discharging circuit almost invariable oscillates. Consequently, the two poles reverse their polarities as mentioned above. Naturally, this reversal of polarities will not occur unless discharges occur. The circuit shown in FIGURE 3 is the one which takes advantage of the above phenomena. As in the case of FIGURES 1 and 2, the control coil 7 of saturable reactor 6 is connected between the discharge gap, but the condenser 31 is inserted in the circuit which connects the gap with the coil 7, and the said condenser is so connected as to be between the gap and the coil 7. A rectifying element 32 is inserted into the circuit which connects one pole of the condenser 31 and the workpiece 2, and the rectifying direction will be towards the workpiece 2. Therefore, while discharges are in progress and when the workpiece 2 is of positive polarity, current cannot flow into the condenser 31 due to the said element 32, but, as explained above, when the current oscillates while the discharges are in progress, and when the electrode becomes of positive polarity and workpiece of negative, current flows through the condenser 31 and the elment 32 and the said condenser 31 is charged by the said current and its terminal voltage will rise.

The condenser 31 is connected with the coil 7, the discharge current of the condenser 31 will, as explained above, flow to coil through the resistance 33, and the saturable reactor 6 will be saturated by the current as explained in FIGURES 1 and 2. Such saturation will occur only when discharges are continued in discharge gap, namely, when normal machining is in progress. Supposing that discharge gap is brought narrower than the standard value by some reasons and/or brought into short circuit, discharge frequency will decrease and becomes zero. When this happens, charging of the condenser 31 will not be performed, and current ceases to flow to the coil 7, the reactor 6 becomes unsaturated. Charging current of the condenser 3 will be decreased to suppress the machining current which has been flowing between the discharge gap.

When discharging gap is narrowed or short circuit is formed, the servo mechanism will move to bring the electrode 1 upward and then the electrode 1 will move downward to form the required discharge gap, as mentioned in FIGURE 2. Such mechanism is widely used to this type of machining apparatus.

When the electrode 1 moves downward to the required gap distance, the discharges will occur even at decreased frequency. Up to this stage, the reactor 6 will remain unsaturated as explained in the above. It will be very easy to understand that the discharges started at this stage are very stabilized. When discharges are thus started, oscillation will again set in the discharge gap and the condenser 31 will be gradually charged. With the charging of condenser, current will again flow to the coil 7 to bring the saturable reactor to saturation. In this way, normal machining can again be reached.

As is evident from the above explanation, in the proposed circuit, the current which flows between the gap is rapidly decreased by the reactor 6 when the discharge gap is brought narrow and is kept decreased until stabilized discharges recommence to be performed, and therefore, irregularity in the electrode feed is completely prevented. The electric energy in controlling the irregularity has nothing to do with the electric energy required for machining.

As explained above, my invention proposes a discharge machining apparatus which shortens the time required for normal discharges to be recommenced, ensures higher precision in machining and increases machining speed considerably in short circuit, and to recover the decreased current only when required discharges are commenced, by means of providing a means whereby, when the electrode is pushed upward and moves downward to the required position to commence discharges, the speed of electrode is increased.

It is natural that the same advantages can be achieved when the mean resistance value is decreased not necessarily because of short circuit but because of narrowed discharge gap.

My invention does not limit itself to a few examples given above but should be applicable to many suitable modifications unless the principle of my invention is not changed.

I claim as my invention:

1. Spark discharge machining apparatus comprising, in combination, an electrode and workpiece which form a spark discharge gap therebetween, a servomechanism responsive to a gap discharge condition normally to feed the electrode in relation to the workpiece for normally maintaining a working gap distance therebetween and for temporarily retracting the electrode in response to a short-circuit condition, thereby to interrupt current flow through the gap, an energy storage circuit connected across the gap to produce intermittent spark discharges therein during normal machining conditions, and means to deliver machining energy to said storage circuit including a rectifier having an alternating current input, and saturable reactor means in said input, including a control coil and an energizing circuit for said coil connected to the spark discharge gap for maintaining the reactor substantially saturated in response to said normal machining conditions, said energizing circuit including means expediting deenergization of said control coil upon removal of energization thereof as the electrode is being retracted, in response to a short-circuit condition of said gap, and means delaying reenergization of said control coil while the electrode is fed back to the normal working gap distance from the workpiece.

2. The combination defined in claim 1, wherein the means expediting deenergization of the control coil comprises a direct-voltage source connected serially with the control coil in the energizing circuit with a polarity opposed therein to the normal gap voltage producing energization of such coil.

3. The combination defined in claim 1, wherein the means expediting deenergization of the control coil comprises a direct-voltage source connected serially with the control coil in the energizing circuit with a polarity opposed therein to the normal gap voltage producing energization of such coil, and the means delaying reenergization of the control coil comprises an inductive reactance serially connected with the coil and a rectifier by-passing said inductive reactance with a polarity which passes current from said direct-voltage source through the coil.

4. The combination defined in claim 3, wherein the energizing circuit for the control coil further includes a first resistance connected in series with the direct-voltage source and a relatively small resistance connected in shunt with the direct-voltage source and said first resistance.

5. The combination defined in claim 2, and means operable independently of the control coil energizing circuit to expedite feed movement of the electrode following electrode retraction.

6. The combination defined in claim 2, wherein the servomechanism comprises a motor having an energizing circuit including a source of primary voltage representing spark gap mean voltage, a secondary source of voltage connected opposingly in series with said primary voltage source and substantially equal in magnitude to the normal spark gap mean voltage, and a normally inactive third voltage source connected opposingly in series with said secondary source, including means rendering said third source active in response to interruption of gap current flow upon retraction of the electrode.

7. The combination defined in claim 6, wherein the third voltage source comprises a load resistance serially connected with the motor and the first and second sources, a rectifier having its output energizingly connected across said load resistance, and rectifier alternating current energizing means including a saturable reactor in series with the rectifier and having a control winding connected in series with the means to deliver machining energy to the storage circuit, thereby to maintain the latter saturable reactor unsaturated during normal machining and saturable by the increased current flow in its control winding caused by a short-circuit condition in the spark gap.

8. The combination defined in claim 1, wherein the servomechanism comprises a motor having an energizing circuit including a source of primary voltage representing spark gap mean voltage, a secondary source of voltage connected opposingly in series with said primary voltage source and substantially equal in magnitude to the normal spark gap mean voltage, and a normally inactive third voltage source connected opposingly in series with said secondary source, including means rendering said third source active in response to interruption of gap current flow upon retraction of the electrode.

9. The combination defined in claim 1, wherein the energizing circuit for the control coil comprises a pair of energizing leads connecting the coil across the spark discharge gap, a rectifier element inserted in one such lead with a polarity opposing normal discharge machining polarity of the gap, and a condenser shunted across said leads at a location between the coil and the rectifier element, thereby to rectify oscillatory energy half-cycles occurring across the gap and apply the same to energization of the control coil to maintain substantial saturation of the saturable reactor during normal machining.

10. In spark discharge machining apparatus including an electrode and workpiece, servomechanism to feed the electrode, and periodically discharging means to energize the spark discharge gap formed by the electrode and workpiece; alternating voltage input terminals, a rectifier, a saturable reactor interposed between said terminals and rectifier and having a control coil, and an energizing circuit for said control coil comprising a pair of energizing leads connecting the coil across the spark discharge gap, a rectifier element inserted in one such lead with a polarity opposing normal discharge machining polarity of the gap, and a condenser shunted across said leads at a location between the coil and the rectifier element, thereby to rectify oscillatory energy half-cycles occurring across the gap and apply the same to energization of the control coil to maintain substantial saturation of the saturable reactor during normal machining.

11. Spark discharge machining apparatus comprising, in combination, an electrode and workpiece which form a spark discharge gap therebetween, a servomechanism responsive to a gap discharge condition normally to feed the electrode in relation to the workpiece for normally maintaining a working gap distance therebetween and for temporarily retracting the electrode in response to a short-circuit condition, thereby to interrupt current flow through the gap, an energy storage circuit connected across the gap to produce intermittent spark discharges therein during normal machining conditions, and means to deliver machining energy to said storage circuit including a rectifier having an alternating current input, and saturable reactor means in said input, including a control coil and an energizing circuit for said coil connected to the spark discharge gap for maintaining the reactor substantially saturated in response to said normal machining conditions, said energizing circuit including means expediting deenergization of said control coil upon removal of energization thereof as the electrode is being retracted, in response to a short-circuit condition of said gap.

12. Spark discharge machining apparatus comprising, in combination, an electrode and workpiece which form a spark discharge gap therebetween, a servomechanism responsive to a gap discharge condition normally to feed the electrode in relation to the workpiece for normally maintaining a working gap distance therebetween and for temporarily retracting the electrode in response to a short-circuit condition, thereby to interrupt current flow through the gap, an energy storage circuit connected across the gap to produce intermittent spark discharges therein during normal machining conditions, and means to deliver machining energy to said storage circuit including a rectifier having an alternating current input, and saturable reactor means in said input, including a control coil and an energizing circuit for said coil connected to the spark discharge gap for maintaining the reactor substantially saturated in response to said normal machining conditions, said energizing circuit including means delaying reenergization of said control coil while the electrode is fed back to the normal working gap distance from the workpiece, while permitting rapid deenergization of the control coil in response to a short-circuit condition as the electrode is being retracted.

References Cited in the file of this patent

UNITED STATES PATENTS

| | | |
|---|---|---|
| 2,365,611 | White | Dec. 19, 1944 |
| 2,726,356 | Rockafellow | Dec. 6, 1955 |
| 2,924,751 | Inoue | Feb. 9, 1960 |